(12) United States Patent
Ku et al.

(10) Patent No.: US 12,469,859 B2
(45) Date of Patent: Nov. 11, 2025

(54) VACUUM BATTERY STRUCTURAL ASSEMBLY AND VACUUM MULTI-CELL BATTERY MODULE

(71) Applicant: Institute of Nuclear Energy Research, Atomic Energy Council, Executive Yuan, Taoyuan (TW)

(72) Inventors: Hung-Hsien Ku, Taoyuan (TW); Shang-Qing Zhuang, Taoyuan (TW); Ning-Yih Hsu, Taoyuan (TW); Chien-Hong Lin, Taoyuan (TW); Han-Jou Lin, Taoyuan (TW); Yi-Hsin Hu, Taoyuan (TW); Po-Yen Chiu, Taoyuan (TW); Yao-Ming Wang, Taoyuan (TW)

(73) Assignee: Institute of Nuclear Energy Research, Atomic Energy Council, Executive Yuan, Taoyuan (TW)

( * ) Notice: Subject to any disclaimer, the term of this patent is extended or adjusted under 35 U.S.C. 154(b) by 553 days.

(21) Appl. No.: 18/058,515

(22) Filed: Nov. 23, 2022

(65) Prior Publication Data

US 2024/0136546 A1 Apr. 25, 2024
US 2024/0234753 A9 Jul. 11, 2024

(30) Foreign Application Priority Data

Oct. 21, 2022 (TW) .................................. 111140109

(51) Int. Cl.
*H01M 8/0273* (2016.01)
*H01M 8/18* (2006.01)
*H01M 8/2455* (2016.01)

(52) U.S. Cl.
CPC ......... *H01M 8/0273* (2013.01); *H01M 8/188* (2013.01); *H01M 8/2455* (2013.01)

(58) Field of Classification Search
None
See application file for complete search history.

(56) References Cited

U.S. PATENT DOCUMENTS

2003/0188413 A1* 10/2003 Mlinar ................ H01M 8/2465
29/722
2024/0222682 A1* 7/2024 Shaffer, II ........... H01M 50/437

FOREIGN PATENT DOCUMENTS

CN 108091918 A * 5/2018 .......... H01M 50/618

* cited by examiner

Primary Examiner — Brian R Ohara
Assistant Examiner — M. T. Leonard
(74) Attorney, Agent, or Firm — Wang Law Firm, Inc.

(57) ABSTRACT

A vacuum battery structural assembly and a vacuum multi-cell battery module composed thereof are provided and include a first repeating unit including a first frame plate and a second frame plate with respect to the first frame plate; and an electrolyte channel defined within the first frame plate and the second frame plate to accommodate a liquid electrolyte, wherein both a surface of the first frame plate and a surface of the second frame plate include a vacuum suction area, the vacuum suction area includes a vacuum aperture and a vacuum channel, wherein the vacuum aperture is formed on at least one surface of the first frame plate and the second frame plate, the vacuum channel is positioned inside the first frame plate and the second frame plate, and is configured to generate a longitudinal pressing suction force and seal the first frame plate and the second frame plate.

11 Claims, 13 Drawing Sheets

VACUUM BATTERY STRUCTURAL ASSEMBLY AND VACUUM MULTI-CELL BATTERY MODULE

CROSS-REFERENCE TO RELATED APPLICATION

This application claims the benefit from the Taiwan Patent Application No. 111140109, filed on Oct. 21, 2022, in the Taiwan Intellectual Property Office, the disclosures of which are hereby incorporated by reference in their entirety for all purposes.

BACKGROUND OF THE INVENTION

1. Field of the Invention

The present disclosure relates to the technical field of batteries, and particularly relates to a lightweight vacuum battery structural assembly and a vacuum multi-cell battery module composed thereof.

2. Description of the Related Art

With the development of science and technology, electronic equipment has become an indispensable necessity, which greatly reducing costs of workers and time and bringing convenience to life. Examples of electronic equipment include display devices, vehicles, computers, etc. The power supply of electronic equipment is mainly divided into two ways—cord-based power supplies and batteries. However, cord-based power supplies are generally applied to stationary electronic equipment. Although it can provide stable power supply, it has some disadvantages, for example, being inconvenient to move. For mobile electronic devices, batteries are one of the most important components. In order to meet various specifications and requirements of electronic devices, different types of batteries have been develop, such as accumulators, lithium batteries, flow batteries, etc.

Among all kinds of batteries, all-vanadium redox flow batteries have the advantages of long service life and high safety, and have become one of the main energy storage technologies for renewable energy. Traditional flow batteries mostly use bolts and nuts as the fixing method of the voltaic pile. This method may usually lead to ununiform pile locking force and difficulty in disassembly and assembly, and thus the internal parts is difficult to replace. In addition, because multiple voltaic piles must be locked at the same time, the reaction force generated between the multiple voltaic piles causes different distance between each voltaic pile, which affects the efficiency of the electrode reaction and conduction of the battery. The power storage capacity of traditional flow batteries is ununiform, and the yield rate is non-optimal, which affects the service life of the batteries and causes electronic equipment failure.

In view of the foregoing, in order to improve the deficiencies of the prior art, the inventors of the present disclosure have considered and designed a battery structural assembly and a battery module, thereby enhancing the implementation and utilization in the industry.

SUMMARY OF THE INVENTION

In view of this, in order to solve the problems of ununiform voltaic pile locking force and difficulty in disassembly and assembly of the battery module in the prior art, the present disclosure integrates the vacuum chuck clamp into the battery pile structure, thereby solving the technical problem caused by using bolts and nuts locking in the prior art and reducing the overall volume and weight of the battery piles. The use of vacuum suction enables the bonding interface to fix the battery frame plate uniformly and stably, which can prevent the liquid leakage or device damaging problems of the traditional locking method caused by uneven force. The present disclosure need not dismantle the entire battery module to individually replace the defected battery unit, which greatly increase the convenience of battery module maintenance.

The present disclosure provides a vacuum battery structural assembly, comprising:
a first repeating unit comprising:
a first frame plate; and
a second frame plate disposed with respect to the first frame plate; and
an electrolyte channel defined within the first frame plate and the second frame plate to accommodate a liquid electrolyte;
wherein both a surface of the first frame plate and a surface of the second frame plate comprise a vacuum suction area, the vacuum suction area comprises a vacuum aperture and a vacuum channel, and the vacuum aperture is defined on the surfaces of the first frame plate and the second frame plate, the vacuum channel is positioned inside the first frame plate and the second frame plate, and is configured to generate a longitudinal pressing suction force through the vacuum aperture to seal the first frame plate and the second frame plate.

Preferably, the vacuum aperture is defined on one of the following:
(i) a surface same as the vacuum suction area of the first frame plate and the second frame plate;
(ii) a surface different from the vacuum suction area of the first frame plate and the second frame plate; or
(iii) a combination thereof.

Preferably, the longitudinal pressing suction force of the vacuum suction area is:

$$\text{longitudinal pressing suction force (kg)} = \frac{S \times P}{\mu}$$

wherein S is a suction area of the vacuum suction area, P is a vacuum pressure, and μ is a safety factor ranging from 2.5 to 4.

Preferably, the vacuum battery structural assembly further comprising: a second repeating unit, the second repeating unit is disposed on the first repeating unit, the second repeating unit comprising the first frame plate and the second frame plate disposed with respect to the first frame plate.

Preferably, a first hollow area is defined on the second frame plate and sequentially comprises: a first carbon felt, a first flexible gasket, a proton exchange membrane and a second flexible gasket; a second hollow area is defined on the first frame plate and sequentially comprises: a second carbon felt, a plurality of manifold gaskets and a graphite plate, each of the first frame plate and the second frame plate of the vacuum battery structural assembly has a substantially equal carbon felt compression ratio.

Furthermore, the present disclosure provides a vacuum multi-cell battery module, further comprising:

a plurality of vacuum battery structural assemblies according to any one of the embodiments;
a first end plate covering the second frame plate; and
a second end plate covering the first frame plate.

Preferably, the first end plate sequentially comprises: a first current collector plate, a plurality of manifold gaskets and a graphite plate, the first current collector plate is disposed on a first current collector plate recess of the first end plate, the plurality of manifold gaskets are disposed on both sides of the first current collector plate recess, and the graphite plate is disposed on the manifold gasket.

Preferably, the first end plate does not have fins.

Preferably, the second end plate comprises: a second current collector plate recess, and a second current collector plate is accommodated in the second current collector plate recess.

Preferably, the first frame plate comprises a miniature check valve that is connected to the vacuum channel.

Preferably, the vacuum multi-cell battery module is selected from the group consisting of a flow battery and a fuel cell.

The beneficial effect of the present disclosure is that the vacuum suction principle is applied on the frame plates of the flow battery. When the frame plates is assembled, the air in the vacuum area in the frame plates is sucked out by a vacuum pump to generate negative air pressure. The frame plates are sucked together by the vacuum force to achieve the purpose of pile assembly. Owing to the structure of the vacuum chuck and the surface structure of the battery frame plate, a 100 cm$^2$ vacuum suction area is designed around the electrode and the flow channel of the flow battery with an 100 cm$^2$ electrode area. A vacuum pump is applied to the suction port to generate a vacuum, such that the suction range reaches 90% relative vacuum degree, that is, a suction force of 23 kg. The experimental results show that the the frame plates of the flow battery of the present disclosure can continue to operate for more than 0.5 hour under the fluid pressure of 4 bar without leakage.

The technical features of the present disclosure will be described in detail below with specific embodiments in conjunction with the accompanying drawings, so that people skilled in the art can easily understand the purpose, technical features, and advantages of the present disclosure.

BRIEF DESCRIPTION OF THE DRAWINGS

In order to more clearly illustrate the technical solutions of the embodiments of the present disclosure, the accompanying drawings that need to be used in the description of the embodiments of the present disclosure will be briefly introduced below. Obviously, the accompanying drawings described below are only certain embodiments of the present disclosure. For people skilled in the art, other drawings can also be obtained according to these drawings.

DETAILED DESCRIPTION OF THE PREFERRED EMBODIMENTS

Advantages and features of one or more exemplary embodiments and methods of accomplishing the same may be understood more readily by reference to the following detailed description of the exemplary embodiments and the accompanying drawings. Exemplary embodiments of the present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and exemplary embodiments of the present invention will only be defined by the appended claims.

It will be understood that although the terms "first", "second", etc. may be used herein to describe various elements, components, regions, sections, layers and/or sections, these elements, components, regions, sections, layers and/or sections should not be limited by these terms. These terms are only used to distinguish one element, component, region, section, layer and/or section from another element, component, region, section, layer and/or section.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Figure 1:
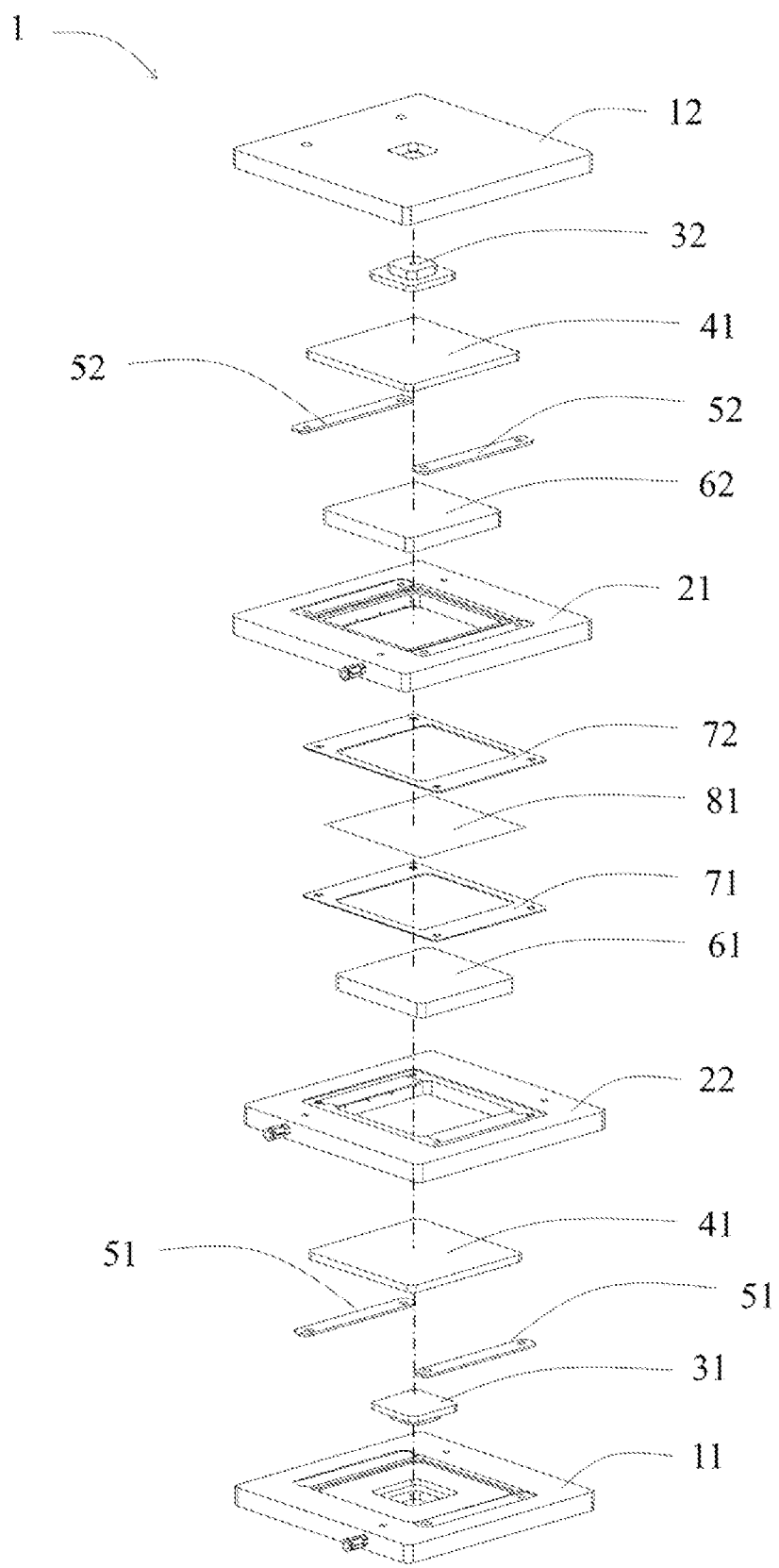
FIG. 1 is an exploded view of the vacuum battery structural assembly of the present disclosure.

Please refer to FIG. 1. FIG. 1 is an exploded view of the vacuum battery structural assembly of the present disclosure. The present disclosure provides a vacuum battery structural assembly 1, which is composed of a vacuum battery structural assembly 1. The vacuum battery structural assembly 1 includes at least one repeating unit (for example, includes a first repeating unit 10, a second repeating unit 20, the third repeating unit 30, etc., the second repeating unit 20 is positioned on the first repeating unit 10, and so on), each repeating unit includes a first frame plate 21, a second frame plate 22 and a electrolyte channel 213. The second frame plate 22 is disposed with respect to the first frame plate 21. The electrolyte channel 213 is formed within the first frame plate 21 and the second frame plate 22, and passes through the first frame plate 21 and the second frame plate 22 to accommodate a liquid electrolyte, such that the liquid electrolyte circulate in each repeating unit. The liquid electrolyte may be a vanadium sulfate solution.

Figure 2A:
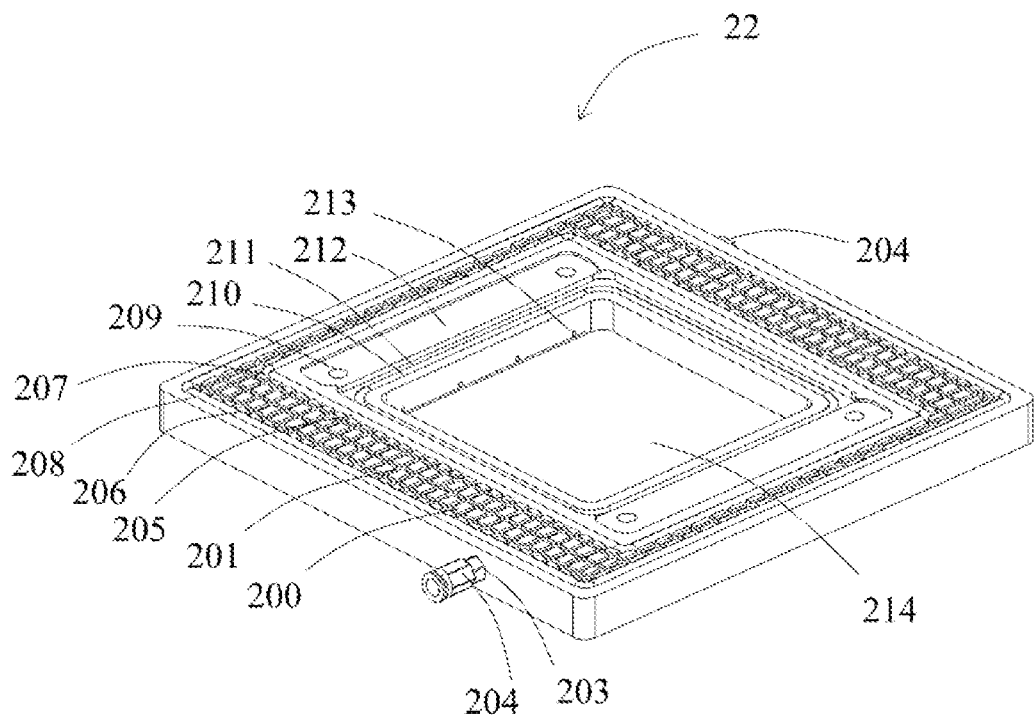
FIG. 2A and FIG. 2B are schematic views of the first frame plate and the second frame plate of the present disclosure, respectively.
Figure 2B:
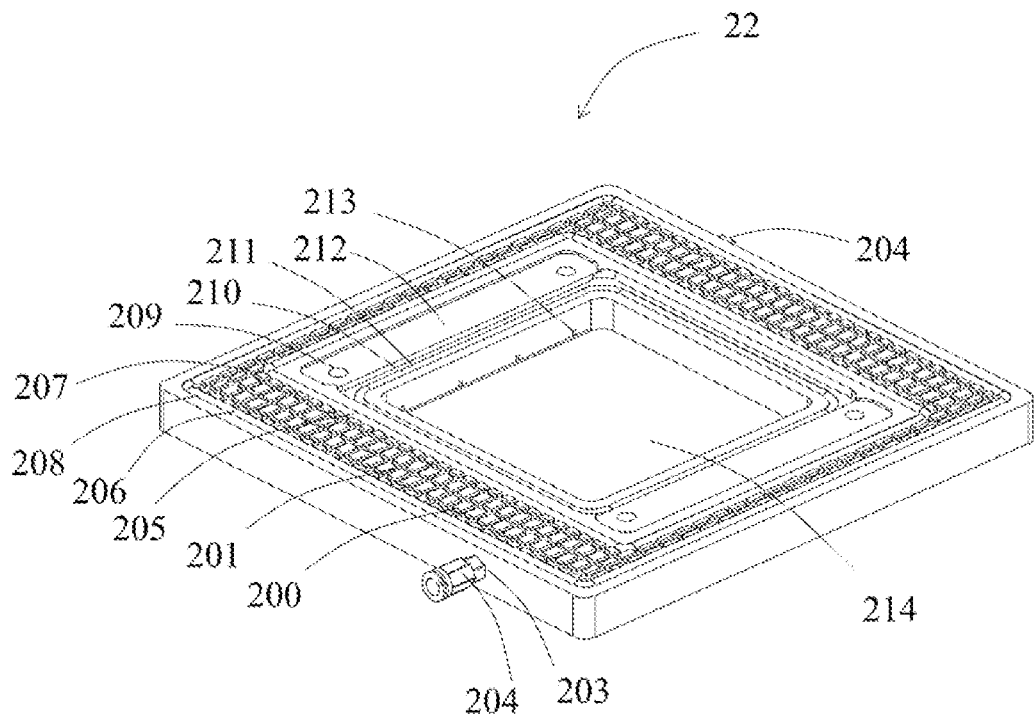
Figure 3A:
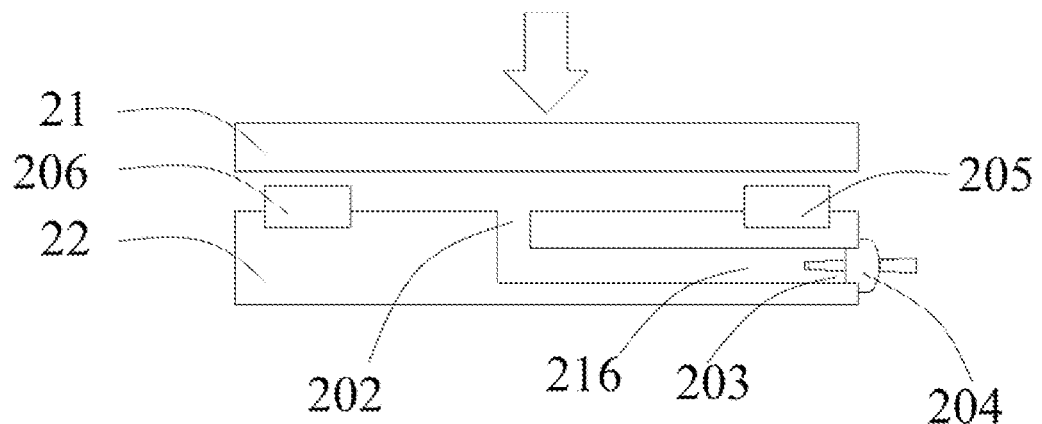
FIG. 3A and FIG. 3B are schematic views of the first frame plate and the second frame plate of the present disclosure before and after assembly, respectively.
Figure 3B:
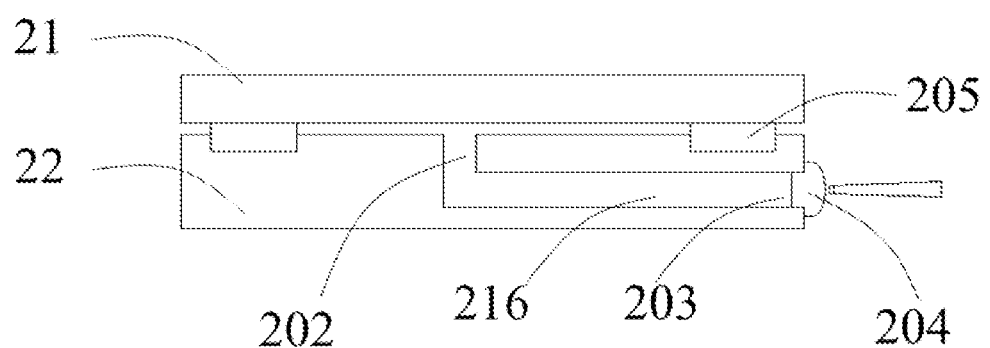

Please refer to FIGS. 2A-3B. FIG. 2A and FIG. 2B are schematic views of the first frame plate 21 and the second frame plate 22 of the present disclosure, respectively. FIG. 3A and FIG. 3B are schematic views of the first frame plate 21 and the second frame plate 22 of the present disclosure before and after assembly, respectively.

At least one of the first frame plate 21 and the second frame plate 22 is provided with a vacuum suction area 200, a plurality of vacuum suction sealing rings (O-rings) 205 and 206 and a miniature check valve 204. The vacuum suction area 200 includes at least one vacuum aperture 202 (see FIGS. 6A-7B) and at least one vacuum channel 216. The vacuum suction area 200 is located on a surface of the first frame plate 21 and the second frame plate 22 having a plurality of mesh grooves 201, such that the mesh groove 201 accelerates the air extraction in the vacuum suction area 200, increases the vacuum suction efficiency. Meanwhile, the mesh groove 201 avoids the vacuum suction area 200 from being dented due to vacuuming, and avoids deformation and damage of the first frame plate 21 and the second frame plate 22. In the present embodiment, the vacuum apertures 202 are formed on the surfaces of the first frame plate 21 and the second frame plate 22 opposite to the mesh grooves. In another embodiment, the vacuum apertures 202 are located on the surfaces of the first frame plate 21 and the second frame plate 22 where the mesh groove 201 is located, or located on both surfaces of the first frame plate 21 and the second frame plate 22. The vacuum channel 216 is formed within the first frame plate 21 and the second frame plate 22 as a flow channel structure required for vacuum evacuation, and generates a longitudinal pressing suction force through the vacuum aperture 202 to seal the first frame plate 21 and the second frame plate 22 together. The first frame plate 21 is provided with a vacuum channel 216 and sealing ring grooves 207, 208 on the flow channel surface. The second frame plate 22 is provided with the vacuum channel 216 and the sealing ring grooves 207, 208 on the surface of a graphite plate 41, thereby generating the vacuum suction area 200 during vacuum suction. a vacuum suction hole 203 is provided on side surfaces of both the first frame plate 21 and the second frame plate 22. The sealing rings 205 and 206 are made of corrosion-resistant EPDM products. The sealing rings 205 and 206 are respectively positioned within the sealing ring grooves 207 and 208 surrounded both sides of the vacuum suction area 200, and are tightly embedded in the first frame plate 21 and the second frame plate 22 to avoid the vacuum adsorption failure caused by the rebound force generated by compressing the electrodes and sealing rings during the voltaic pile assembly. Because the external pressure will be greater than the internal pressure in the vacuum state, and the thicknesses of the battery frame plates are small, a miniature check valve structure 204 is positioned at the vacuum suction hole 203 to prevent the air pressure from back-flushing to the low pressure, resulting in the loss of the vacuum area, thereby ensuring the sealing of the vacuum area.

The present disclosure is a vacuum battery structural assembly 1 that can disassemble individual single cells according to needs, so side surfaces of each frame plate are provided with a vacuum air hole 203. In another embodiment, the vacuum air holes 203 can be moved to the end plate and omit the vacuum suction holes 203 of each frame plate, thereby reducing the thickness of the frame plate.

As shown in FIGS. 3A-3B, the first frame plate 21 and the second frame plate 22 are reverse design. Both have vacuum apertures 202 on the surfaces, the purpose of which is to ensure that each joint surface has a vacuum channel 216 for air extraction and sealing rings 205 and 206 when overlapping repeatedly. When the second frame plate 22 is pressed down, air are simultaneously sucked out through the vacuum apertures 202 located on one side of the first frame plate 21 and the second frame plate 22 to a certain pressure, and then the suction needle is removed to form a vacuum area inside the frame plates. The miniature check valve structure 204 avoids the backflow of external air pressure so as to complete the technical implementation of vacuum suction. Therefore, the vacuum suction area 200 uses the flow field technology to control the air flow direction, so that the air flow can be repidly and reliably extracted from the frame plates. The first frame plate 21 and the second frame plate 22 are made of corrosion-resistant PMMA by CNC milling machine.

The vertical lamination suction force between each of the first frame plate 21 and the second frame plate 22 is mainly affected by the vacuum suction area 200 designed thereon. The area of the vacuum suction area 200 in the present disclosure is 100 cm². The longitudinal lamination suction is defined by the mathematical formula 1:

[Mathematical formula 1]

$$\text{longitudinal pressing suction force (kg)} = \frac{S \times P}{\mu}:$$

Wherein S is a suction area of the vacuum suction area, P is a vacuum pressure, and μ is a safety factor ranging from 2.5 to 4 (the calculated value is 4 in the present embodiment). The vacuum pressure is mainly determined by the vacuum pump. The present disclosure employs the vacuum pump specialized for the vacuum chuck so that the vacuum degree can reach 90%. The conversion value is shown in Table 1. The vacuum pressure can reach −0.912 kg/cm². According to the calculation of mathematical formula 1, the longitudinal pressing suction force is 22.8 kg. A pressure test of 0.6 bar is performed on the suction of each first frame plate 21 and the second frame plate 22 by the longitudinal pressing suction force. The vacuum pump of the present disclosure uses a medium-sized oil-free vacuum pump, model no. is UN-90V. The voltage requirement of the equipment is 110V. The installation diameter is ¼" pipe diameter. The maximum vacuum degree of the equipment can reach 680 mmHg. The maximum flow rate is 90 L/min. The lightweight battery frame plates can accomplish the requirements of vacuum suction using the parameters. If the number of series connections needs to be increased in subsequent operations, it is also possible to replace the real supply pump with a greater flow rate to meet the needs of the operation.

TABLE 1

| Absolute vacuum (mbar) | relative vacuum degree | Fahrenheit kPa (kPa) | vacuum pressure (kg/cm$^2$) | Millimeter of mercury (mmHg) | bar |
|---|---|---|---|---|---|
| 900 | 10% | −10.1 | −0.101 | −76 | −0.101 |
| 800 | 20% | −20.3 | −0.203 | −152 | −0.203 |
| 700 | 30% | −30.4 | −0.304 | −228 | −0.304 |
| 600 | 40% | −40.5 | −0.405 | −304 | −0.405 |
| 500 | 50% | −50.7 | −0.507 | −380 | −0.507 |
| 400 | 60% | −60.8 | −0.608 | −456 | −0.608 |
| 300 | 70% | −70.9 | −0.709 | −532 | −0.709 |
| 200 | 80% | −81.1 | −0.811 | −608 | −0.811 |
| 100 | 90% | −91.2 | −0.912 | −684 | −0.912 |

Figure 4A:
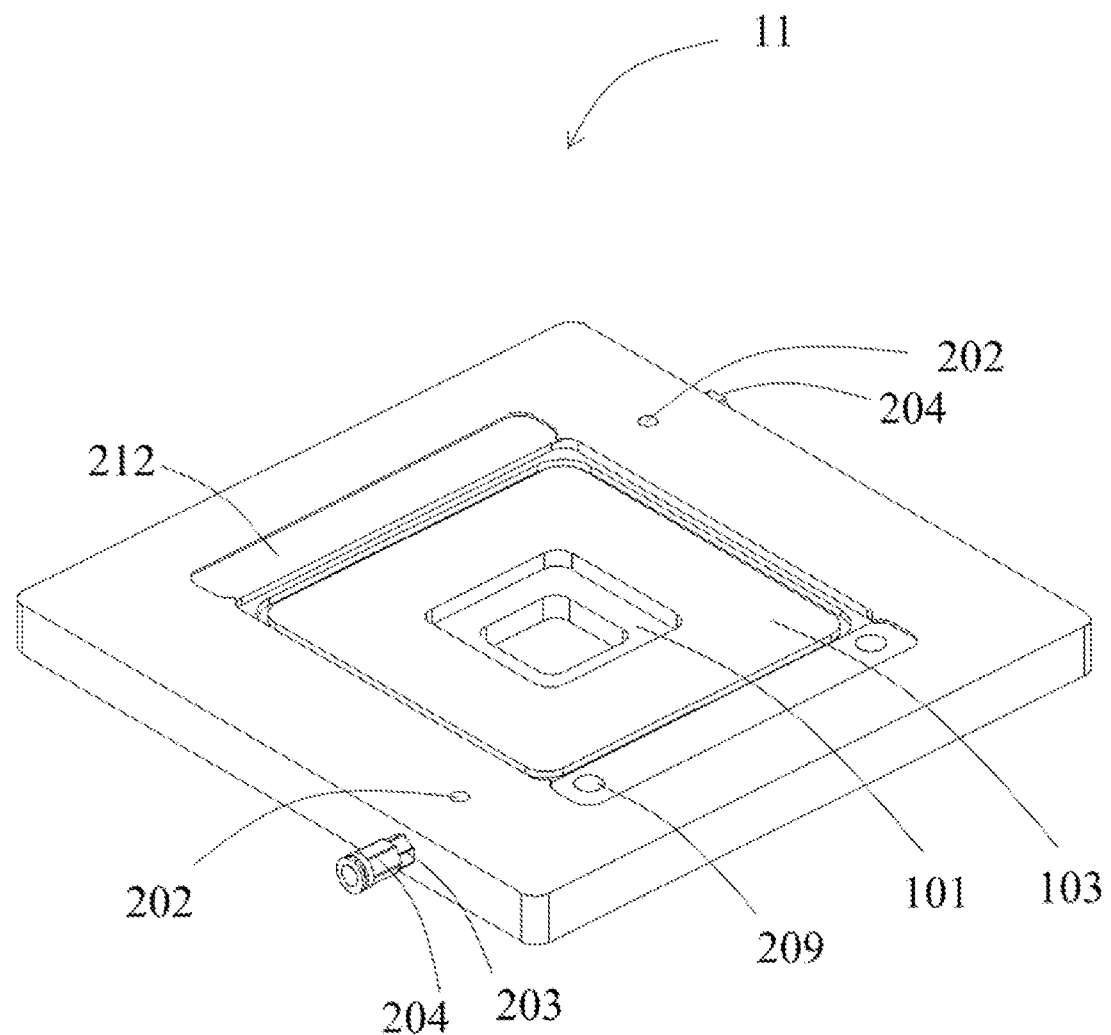
FIG. 4A and FIG. 4B are schematic views of the first end plate and the second end plate of the present disclosure, respectively.
Figure 4B:
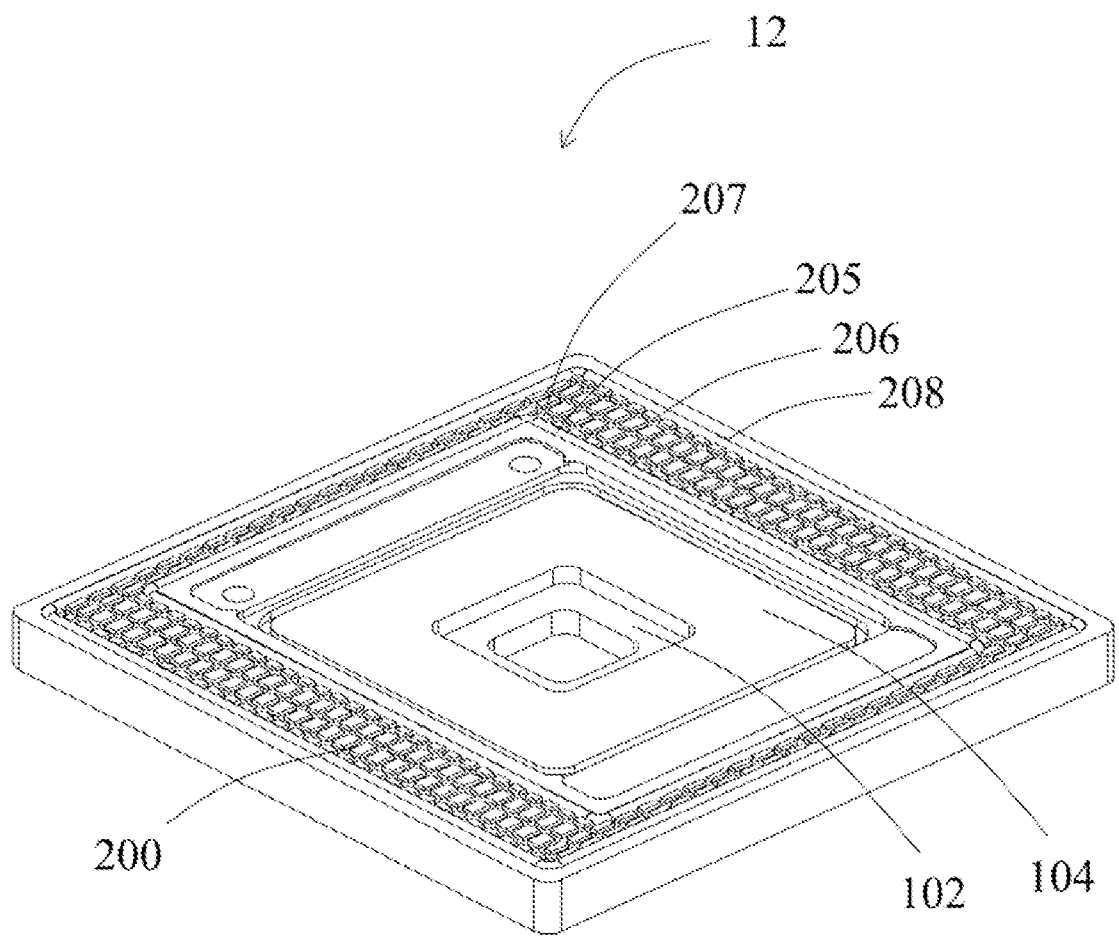

Please refer to FIGS. 4A-4B, the first end plate 11 is designed as a planar plane without installing the sealing rings 205 and 206, and two vacuum apertures 202 are provided on the planar plane. The second end plate 12 is provided with a vacuum suction area 200 having a vacuum aperture 202 on the planar plane and a vacuum channel 216 inside the second end plate 12. This design enables the air to be more reliably sucked out of the vacuum area of the end plates by a vacuum pump. The sealing rings 205 and 206 are installed around the vacuum suction area 200, thereby enhancing the vacuum degree. The first end plate 11 and the second end plate 12 are made of corrosion-resistant PMMA by CNC milling machine. A surface of the first end plate 11 is provided with a first current collector plate groove 101 and a first graphite plate groove 103, while a surface of the second end plate 12 is provided with a second current collector plate groove 102 and a second graphite plate groove 104.

Figure 5A:
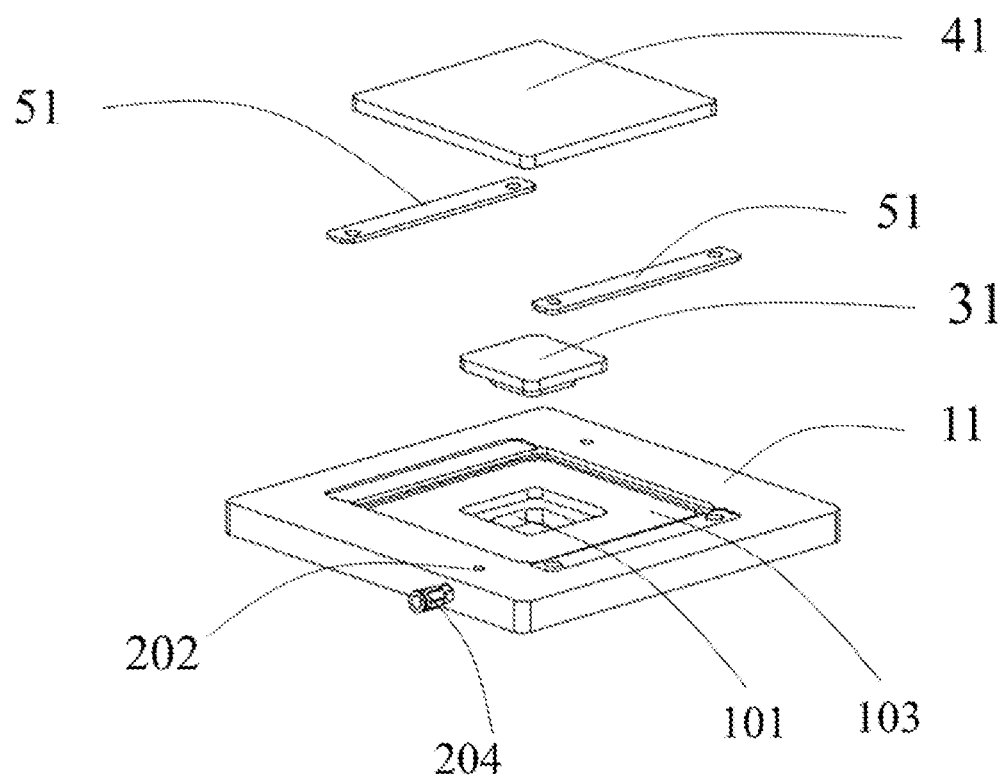
FIG. 5A and FIG. 5B are schematic views of the first end plate of the present disclosure before and after assembly, respectively.
Figure 6A:
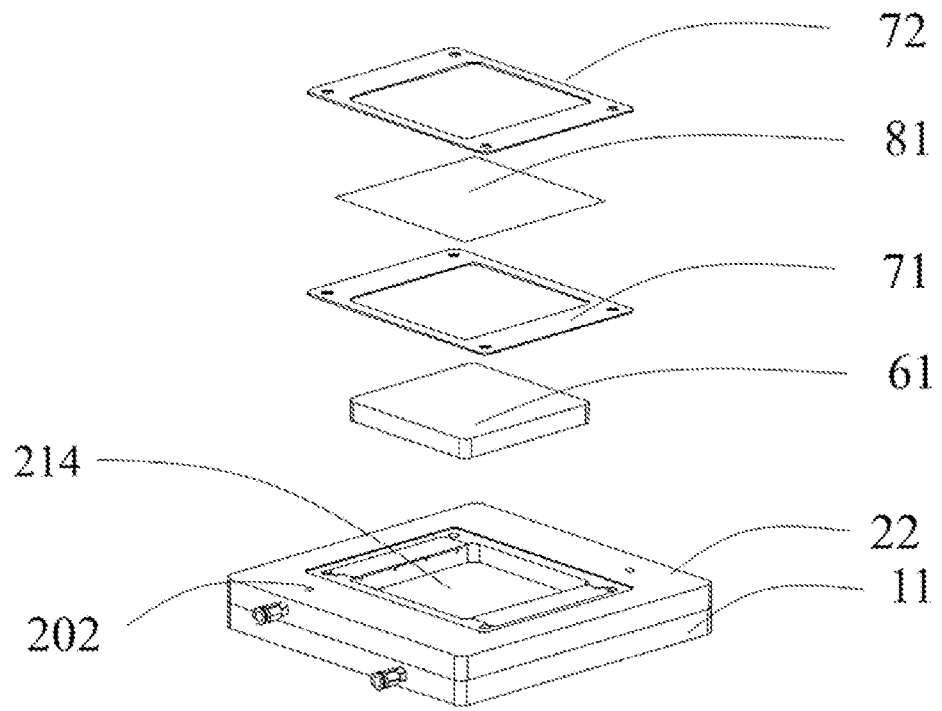
FIG. 6A and FIG. 6B are schematic views of the first end plate and the second frame plate of FIG. 5B before and after assembly, respectively.
Figure 6B:
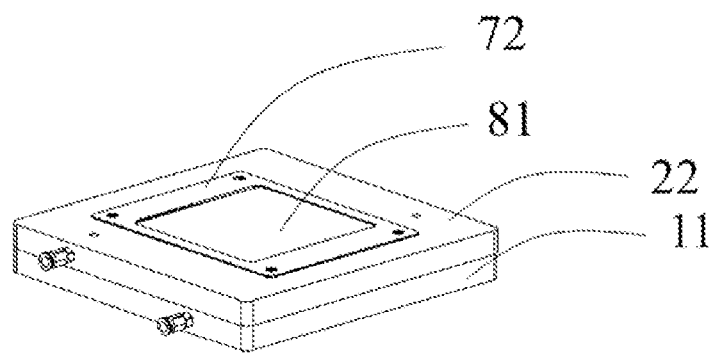
Figure 7A:
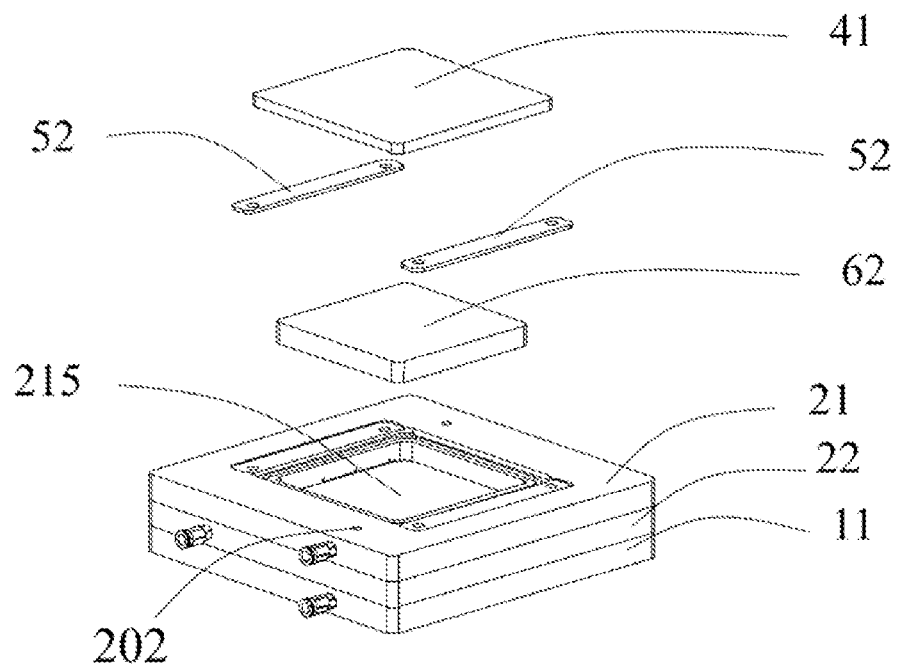
FIG. 7A and FIG. 7B are schematic views of the second frame plate and the first frame plate of FIG. 6B before and after assembly, respectively.
Figure 7B:
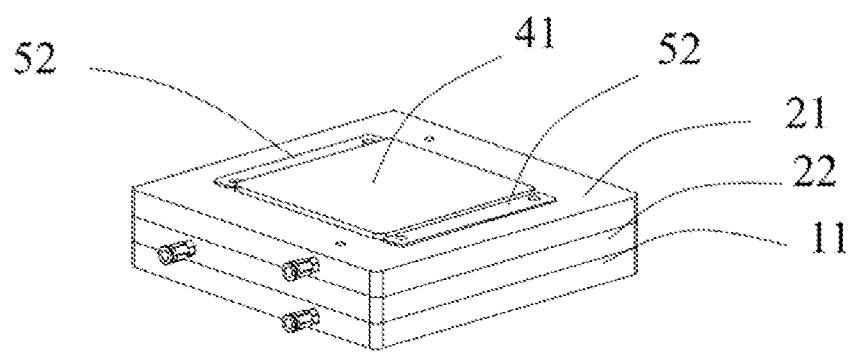
Figure 8:
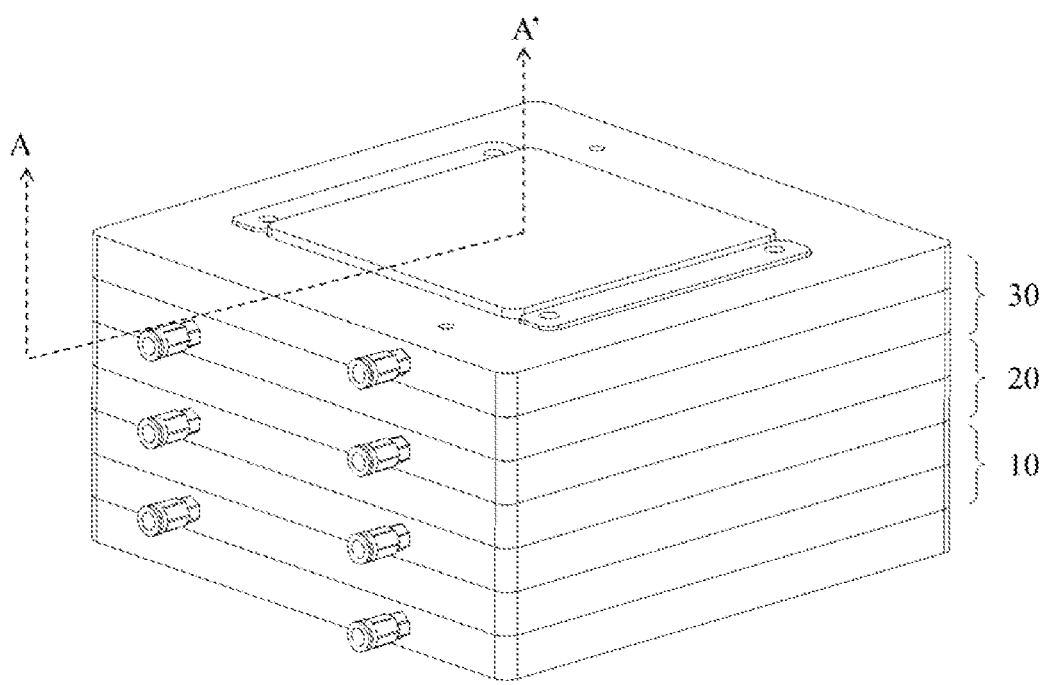
FIG. 8 is a schematic view of the vacuum multi-cell battery module of the present disclosure assembled with three repeating units.
Figure 9A:
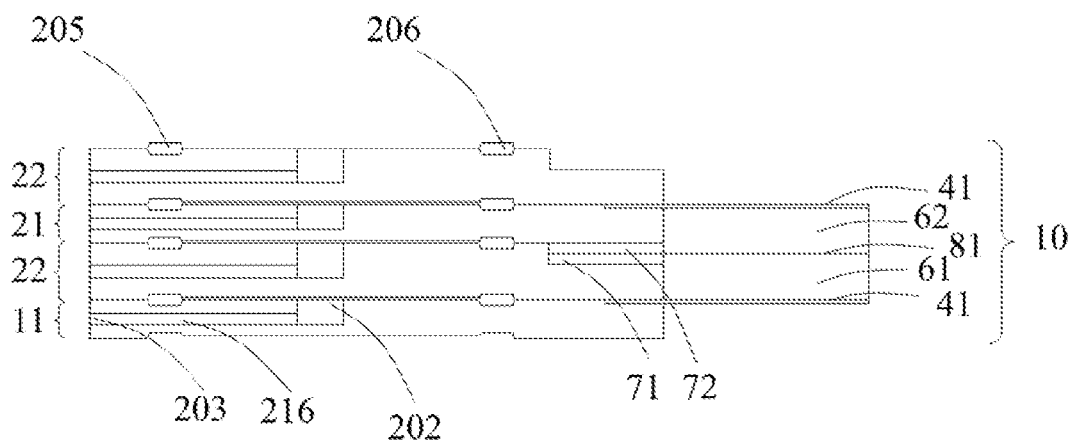
FIG. 9A and FIG. 9B are cross-sectional views taken along the line A-A' when the vacuum multi-cell battery module has one repeating unit and three repeating units, respectively.
Figure 9B:
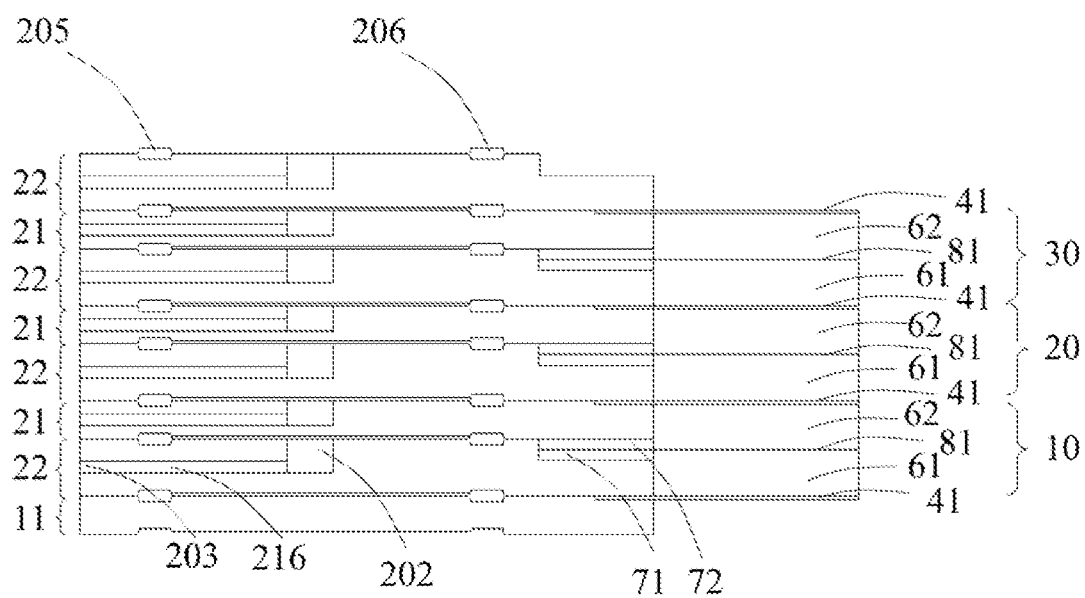
Figure 10A:
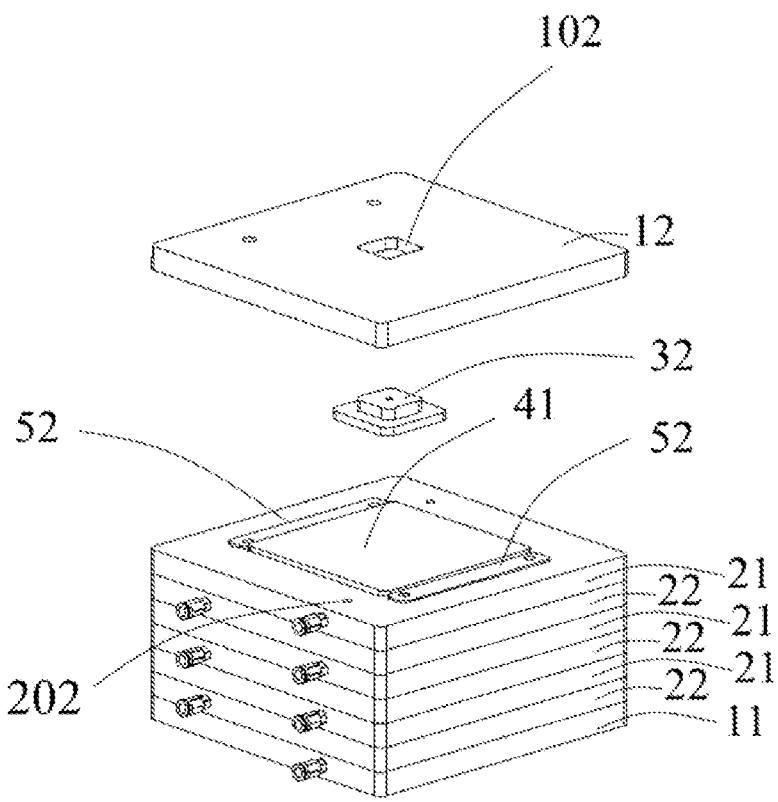
FIG. 10A and FIG. 10B are schematic views of the vacuum multi-cell battery module and the second end plate of FIG. 8 before and after assembly, respectively.
Figure 10B:
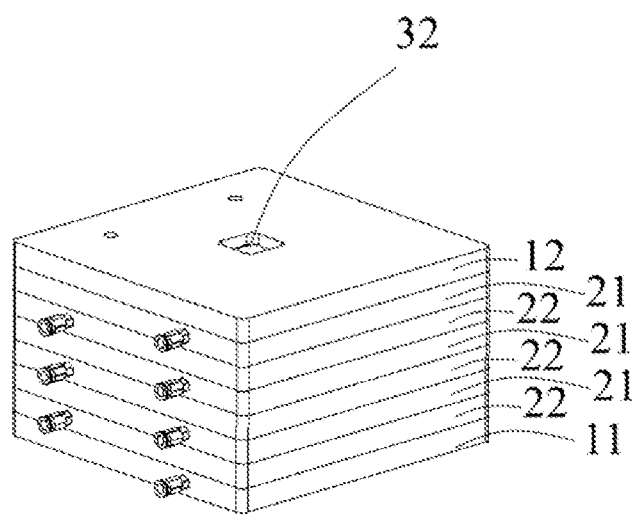
Figure 11A:
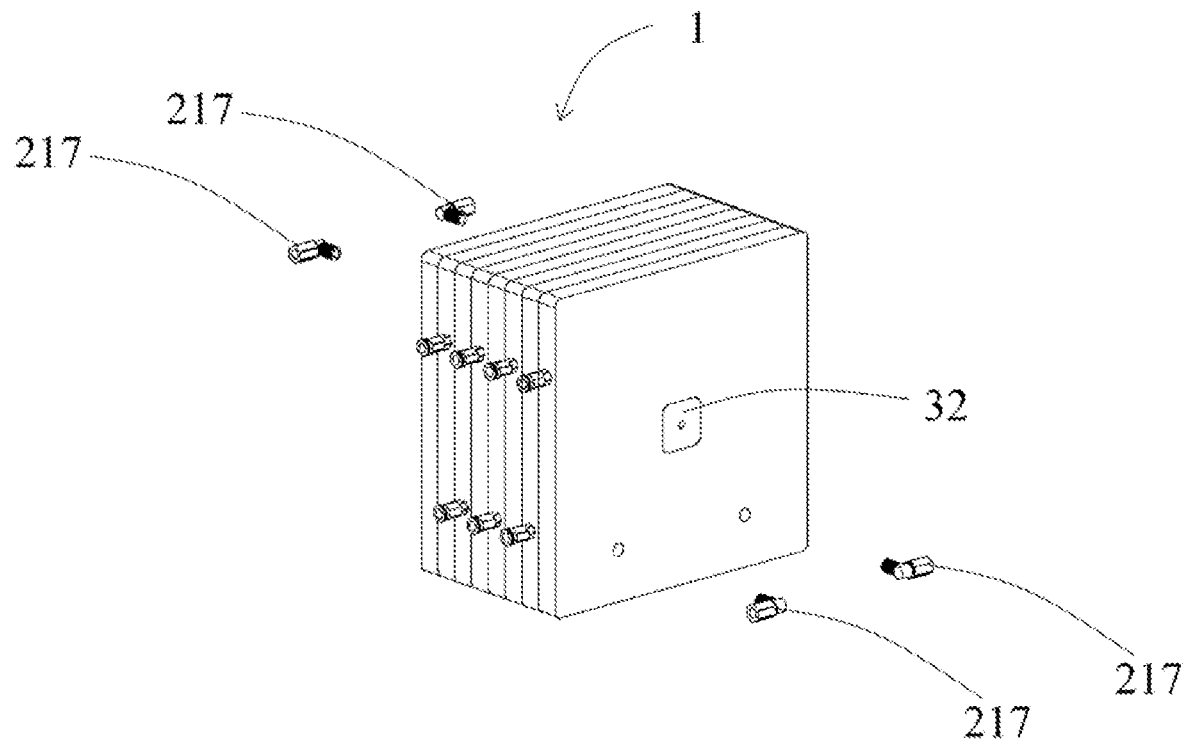
FIG. 11A and FIG. 11B are schematic diagrams of the vacuum multi-cell battery module and the acid/alkali resistant connectors of FIG. 10B before and after assembly, respectively.
Figure 11B:
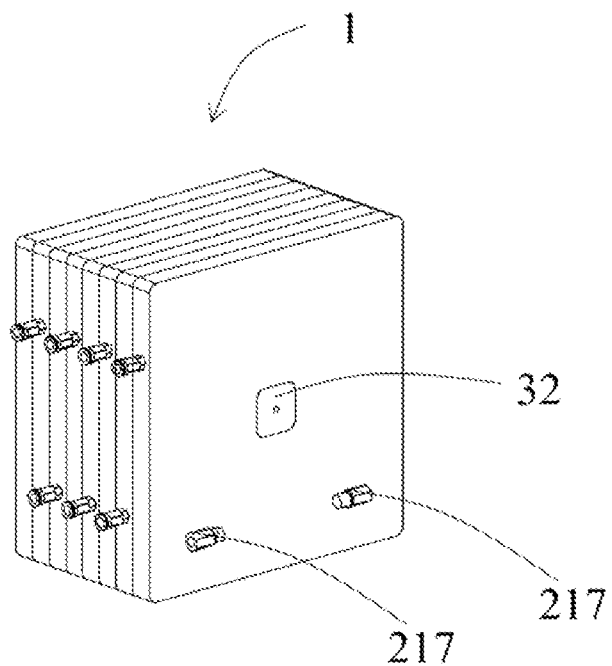

Please refer to FIGS. 5A-11B for the assembly process of the vacuum multi-cell battery module 1 of the present disclosure. FIG. 5A and FIG. 5B are schematic views of the first end plate 11 of the present disclosure before and after assembly, respectively. FIG. 6A and FIG. 6B are schematic views of the first end plate 11 and the second frame plate 22 of FIG. 5B before and after assembly, respectively. FIG. 7A and FIG. 7B are schematic views of the second frame plate 22 and the first frame plate 21 of FIG. 6B before and after assembly, respectively. FIG. 8 is a schematic view of the vacuum multi-cell battery module 1 of the present disclosure assembled with three repeating units. FIG. 9A and FIG. 9B are cross-sectional views taken along the line A-A' when the vacuum multi-cell battery module 1 has one repeating unit and three repeating units, respectively. FIG. 10A and FIG. 10B are schematic views of the vacuum multi-cell battery module 1 and the second end plate 12 of FIG. 8 before and after assembly, respectively. FIG. 11A and FIG. 11B are schematic diagrams of the vacuum multi-cell battery module and the acid/alkali resistant connectors 217 of FIG. 10B before and after assembly, respectively.

Figure 5B:
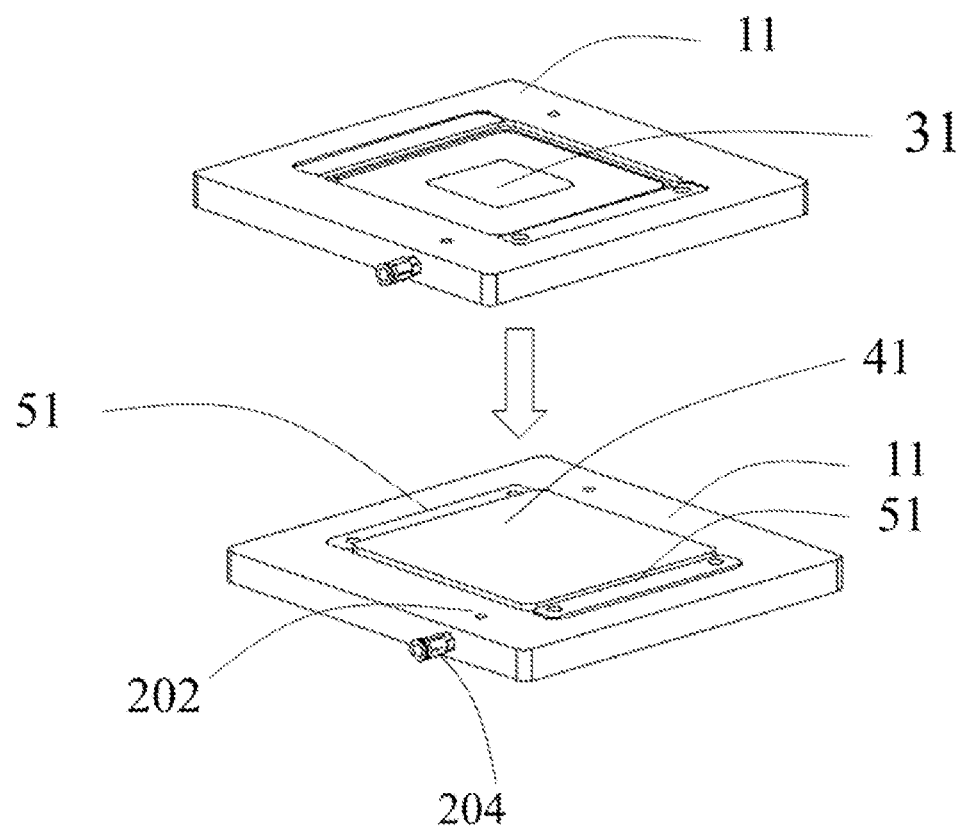

As shown in FIGS. 5A-5B, a first end plate 11 is provided for the first step of assembly. The first current collector plate 31 is firstly disposed into the first current collector plate recess 101 of the first end plate 11. Then, the graphite plate 41 is disposed into the first graphite plate groove 103. A plurality of first manifold gaskets 51 are disposed on both sides of the graphite plate 41 to complete the assembly of the components of the first end plate 11. In the present disclosure, the size of the first current collector plate recess 101 is reduced and is positioned within the graphite plate 41, which omits the structure of fins of the conditional art and avoids the collector plate from affecting the effect of vacuum suction. Therefore, the present disclosure solves the asymmetrical current distribution that the current is low as the high resistance value on both sides of the fin is high, the current is high as the middle resistance value is low. The first current collector plate 31 is made of brass using a CNC milling machine to conduct electricity for the voltaic piles. The first current collector plate 31 is designed in a square step shape, the larger surface is 50*50 mm, which is used as a contact surface with the graphite plate 41; the smaller surface is used as an exposed position outside the voltaic piles, and its area is 30*30 mm.

As shown in FIGS. 6A-6B, after the assembly of the components of the first end plate 11 is completed, the second frame plate 22 and the first end plate 11 are assembled. The vacuum suction area 200 of the second frame plate 22 is disposed towards the first end plate 11. It is note that the vacuum aperture 202 and the vacuum aperture 202 of the first end plate 11 are aligned in the same direction. After the assembly is completed, the vacuum aperture 202 of the first end plate 11 is subjected to vacuum evacuation so that the first end plate 11 and the second frame plate 22 are sucked together. After the assembly of the first end plate 11 and the second frame plate 22 is completed, the first series assembly step is performed. The second flexible gaskets 72 are sequentially disposed into the first hollow area 214 (10*10 cm) in the central area of the second frame plate 22. The proton exchange membrane 81 is clamped by the first flexible gasket 71 and the second flexible gasket 72. Thus, the assembly of the second frame plate 22 is completed. The first flexible gasket 71 and the second flexible gasket 72 are made of corrosion-resistant EPDM rubber sheets and produced by water jet processing. The first flexible gasket 71 and the second flexible gasket 72 are used in the bonding surface of the single cell to press and fix the proton exchange membrane 81 and prevent the leakage of the electrolyte of the electrode. A hollow area is defined in the center of the first flexible gasket 71 and the second flexible gasket 72 where the carbon felt is placed. The proton exchange membrane 81 employs Nafion series products for flow batteries developed by DuPont, such as N117 or N212 proton exchange membranes for flow batteries.

As shown in FIGS. 7A-7B, the first frame plate 21 is then disposed on the second frame plate 22. The vacuum suction area of the first frame plate 21 is disposed towards the second frame plate 22. It is noted that the vacuum aperture 202 of the first frame plate 21 and the vacuum aperture 202 of the second frame plate 22 are aligned in the same direction. After the placement is completed, the second frame plate 22 and the first frame plate 21 are subjected to vacuum evacuation through the vacuum aperture 202 of the second frame plate 22. Finally, the second carbon felt 62 of the first frame plate 21 is disposed in the second hollow area 215 (10*10 cm) in the central area of the first frame plate 21, and a graphite plate sealing ring groove 211 is provided on one side of the second hollow area 215, while a manifold gasket groove 212 is provided on both the upper and lower sides. A plurality of second manifold gaskets 52 are disposed into the manifold gasket groove 212. The manifold gasket groove 212 has a plurality of electrolyte openings 209. The electrolyte is circulated throughout the frame plates. A graphite plate 41 are disposed on the second manifold gaskets 52, and the graphite plate sealing rings 210 are disposed into the graphite plate sealing ring grooves 211 to prevent the electrolyte from passing through the graphite plate and leaks out of the second hollow region 215 (i.e., the electrode region). Therefore, the assembly of the first repeating unit 10 (i.e., one single voltaic pile or one single cell) is completed. The material of the graphite plate sealant strip groove 211 is the same as that of the sealant strips 205 and 206.

As shown in FIG. 8, by repeating the steps of the second frame plate 22 and the first frame plate 21 as shown in FIGS. 6A-7B, a plurality of repeating units 10, 20, 30 (i.e., a multi-voltaic pile or one multi-cell) can be connected in series to the desired number. In the present embodiment, three repeating units 10, 20 and 30 are connected in series is shown as an example, but the present disclosure is not limited thereto.

FIG. 9A shows a cross-sectional view of a single cell with only one repeating unit 10 taken along line A-A' in FIG. 8, while FIG. 9B shows a cross-sectional view of a multi-cell battery pack with three repeating cells 10, 20, 30 taken along line A-A' in FIG. 8. The first end plate 11 and the second frame plate 22 clamp the graphite plate 41, and then the first carbon felt 61, the first flexible gasket 71, the proton exchange membrane 81, the second flexible gasket 72, and the second carbon felt 62 are disposed in sequence. Finally, the graphite plate 41 is disposed and sandwiched between another frame plate (i.e., the first frame plate 21) to form the first repeating unit 10, and so on, the second repeating unit 20 and the third repeating unit 30 can be subsequently formed.

As shown in FIGS. 10A-10B, after the desired number of series is completed, the outer second end plate 12 will be installed to complete the assembly process of the multi-voltaic piles. First, the second current collector plate 32 is disposed on the graphite plate 41, the second end plate 12 is then disposed on the first frame plate 21 and allows the second current collector plate 32 being received within the second current collector plate recess 102. It is noted that the vacuum aperture 202 of the second end plate 12 and the vacuum aperture 202 of the first frame plate 21 are aligned in the same direction. After the placement is completed, the first frame plate 21 and the second end plate 12 are subjected to vacuum evacuation through the vacuum apertures 202 of the first frame plate 21. The material and size of the second current collector plate 32 are the same as those of the first current collector plate 31.

As shown in FIGS. 11A-11B, two acid and alkali resistant joints 217 are finally installed on both sides of each of the end plates. The acid and alkali resistance joints 217 are aligned with the electrolyte openings 209 to serve as the outlet pipeline and inlet pipeline of the electrolyte. The assembly process of the vacuum multi-cell battery module 1 is thus completed. After assembling the voltaic piles, a leak test is conducted using 1.2 times the fluid pressure, i.e., 0.6 bar, to perform the test. The test results show that the voltaic piles have no leakage under this pressure for 30 minutes (i.e., 0.5 hours), and can continue to extend the test time. The present disclosure utilizes vacuum suction principle to the frame plates of the flow battery. When the frame plates are assembled, the air in the vacuum area in the frame plates is sucked out by a vacuum pump to generate negative air pressure. The frame plates are thus sucked together by the vacuum force. The purpose of stack assembly is achieved, and each frame plate has substantially equal distance and carbon felt compressibility under the uniform atmospheric pressure.

The vacuum multi-cell battery module 1 of the present disclosure can be applied to the manufacture of storage batteries such as flow batteries and fuel cells.

The beneficial effect of the present disclosure is that the present disclosure is a vacuum battery structural assembly that can disassemble any individual single cells. The vacuum suction principle is applied on the frame plates of the flow battery. When the frame plates is assembled, the air in the vacuum area in the frame plates is sucked out by a vacuum pump to generate negative air pressure. The frame plates are sucked together by the vacuum force to achieve the purpose of pile assembly. Owing to the structure of the vacuum chuck and the surface structure of the battery frame plate, a 100 cm$^2$ vacuum suction area is designed around the electrode and the flow channel of the flow battery with an 100 cm$^2$ electrode area. A vacuum pump is applied to the suction port to generate a vacuum, such that the suction range reaches 90% relative vacuum degree, that is, a suction force of 23 kg. The experimental results show that the frame plates of the flow battery of the present disclosure can continue to operate for more than 0.5 hour under the fluid pressure of 4 bar without leakage. The voltaic piles of the present disclosure have substantially equal distance and carbon felt compressibility therebetween, so that each voltaic pile has substantially equal electrode reaction, electrical conductivity and electricity storage capacity, which increases the stability of the battery pack and solves the technical problem of the traditional flow batteries, such as ununiform power storage capacity, non-optimal yield, and non-optimal battery life.

The above description is exemplary only and the exemplary embodiments are not limited thereto. Any equivalent modifications or changes that do not depart from the spirit and scope of the present disclosure shall be included in the scope of appended claims.

What is claimed is:

1. A vacuum battery structural assembly, comprising:
   a first repeating unit comprising:
      a first frame plate; and
      a second frame plate disposed with respect to the first frame plate; and
   an electrolyte channel defined within the first frame plate and the second frame plate to accommodate a liquid electrolyte;
   wherein both a surface of the first frame plate and a surface of the second frame plate comprise a vacuum suction area, the vacuum suction area comprises a vacuum aperture and a vacuum channel, and the vacuum aperture is defined on the surfaces of the first frame plate and the second frame plate, the vacuum channel is positioned inside the first frame plate and the second frame plate, and is configured to generate a longitudinal pressing suction force through the vacuum aperture to seal the first frame plate and the second frame plate.

2. The vacuum battery structural assembly of claim 1, wherein the vacuum aperture is defined on one of the following:
   (i) a surface same as the vacuum suction area of the first frame plate and the second frame plate;
   (ii) a surface different from the vacuum suction area of the first frame plate and the second frame plate; or
   (iii) a combination thereof.

3. The vacuum battery structural assembly of claim 1, wherein the longitudinal pressing suction force of the vacuum suction area is:

$$\text{longitudinal pressing suction force (kg)} = \frac{S \times P}{\mu}$$

wherein S is a suction area of the vacuum suction area, P is a vacuum pressure, and $\mu$ is a safety factor ranging from 2.5 to 4.

4. The vacuum battery structural assembly of claim 1, further comprising: a second repeating unit, the second repeating unit is disposed on the first repeating unit, the second repeating unit comprising the first frame plate and the second frame plate disposed with respect to the first frame plate.

5. The vacuum battery structural assembly of claim 1, wherein a first hollow area is defined on the second frame plate and sequentially comprises: a first carbon felt, a first flexible gasket, a proton exchange membrane and a second flexible gasket; a second hollow area is defined on the first frame plate and sequentially comprises: a second carbon felt, a plurality of manifold gaskets and a graphite plate, each of the first frame plate and the second frame plate of the vacuum battery structural assembly has a substantially equal carbon felt compression ratio.

6. A vacuum multi-cell battery module, further comprising:
a plurality of vacuum battery structural assemblies according to claim 1;
a first end plate covering the second frame plate; and
a second end plate covering the first frame plate.

7. The vacuum multi-cell battery module of claim 6, wherein the first end plate sequentially comprises: a first current collector plate, a plurality of manifold gaskets and a graphite plate, the first current collector plate is disposed on a first current collector plate recess of the first end plate, the plurality of manifold gaskets are disposed on both sides of the first current collector plate recess, and the graphite plate is disposed on the plurality of manifold gaskets.

8. The vacuum multi-cell battery module of claim 6, wherein the first end plate does not have fins.

9. The vacuum multi-cell battery module of claim 6, wherein the second end plate comprises: a second current collector plate recess, and a second current collector plate is accommodated in the second current collector plate recess.

10. The vacuum multi-cell battery module of claim 6, wherein the first frame plate comprises a miniature check valve that is connected to the vacuum channel.

11. The vacuum multi-cell battery module of claim 6, wherein the vacuum multi-cell battery module is selected from the group consisting of a flow battery and a fuel cell.

* * * * *